June 24, 1924.

D. J. IBACH 1,498,658

AUTOMOBILE MIRROR

Filed Sept. 11, 1922

INVENTOR.
Douglas J. Ibach.
BY
ATTORNEYS.

Patented June 24, 1924.

1,498,658

UNITED STATES PATENT OFFICE.

DOUGLAS J. IBACH, OF YANKTON, SOUTH DAKOTA.

AUTOMOBILE MIRROR.

Application filed September 11, 1922. Serial No. 587,381.

*To all whom it may concern:*

Be it known that I, DOUGLAS J. IBACH, a citizen of the United States, and a resident of Yankton, in the county of Yankton and State of South Dakota, have invented certain new and useful Improvements in Automobile Mirrors, of which the following is a specification.

My invention aims to provide a mirror adapted to be so mounted on the side of a motor vehicle that normally it reflects the roadway in the rear of the vehicle and when extended reflects the side of the vehicle, whereby the driver without leaving his seat may determine whether or not his tires are flat.

A further object of the invention is the production of a device of this sort which is comparatively inexpensive in construction yet thoroughly efficient and dependable in operation.

The invention, which consists in the construction, combination and novel arrangement of parts, will be clearly understood from the following description, reference being had to the accompanying drawing which forms a part of this application and in which like characters of reference indicate corresponding parts in both views, of which,—

Figures 1, 2:
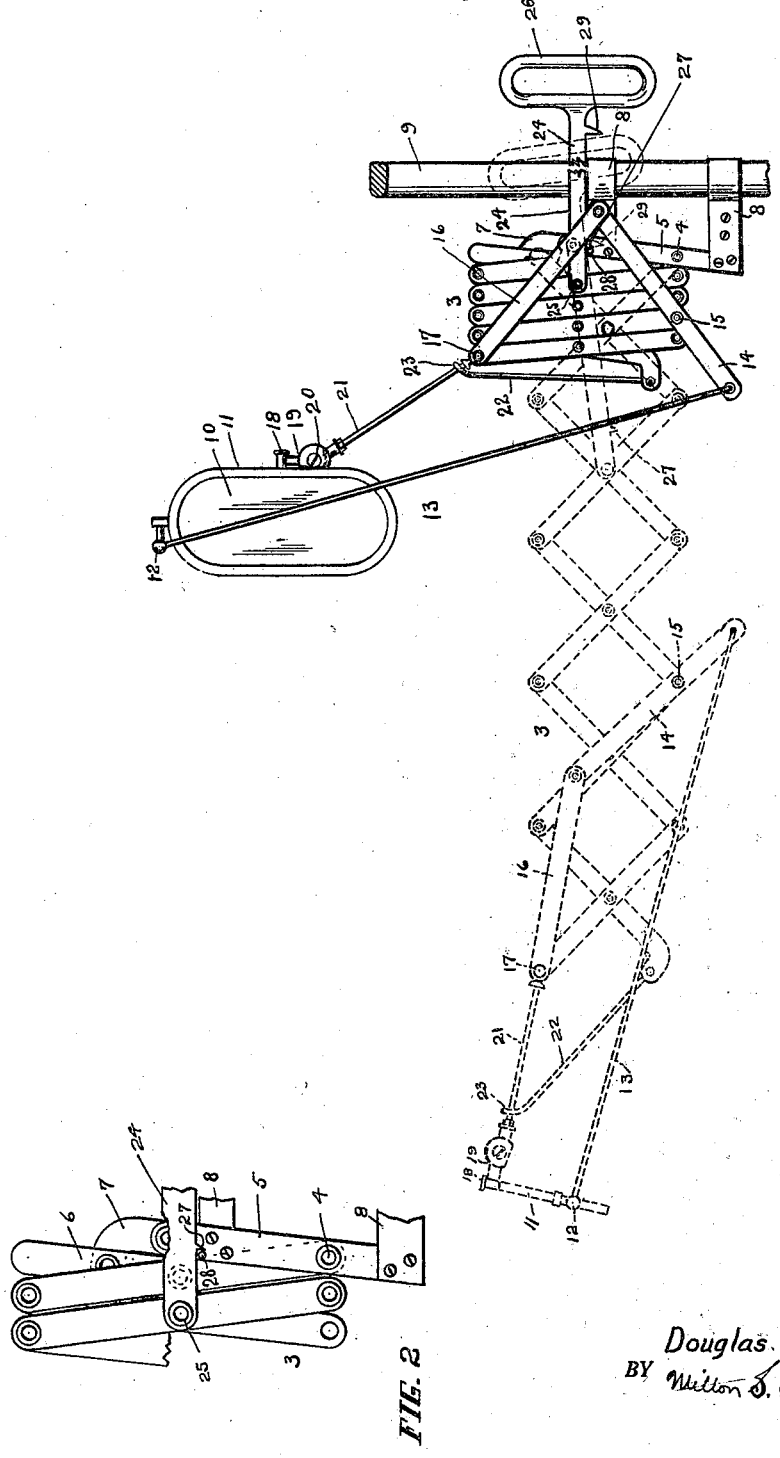
Fig. 1 is a rear elevation of the preferred form of my device.
Fig. 2 is an enlarged, fragmentary elevation of the lazy-tongs and their controlling means.

Referring now to the illustrations, the device illustrated comprises a pair of lazy-tongs, represented generally at 3, and having the free end of one of its arms pivoted, as at 4, to an upright, 5, the free end portion of the companion lazy-tong arm, 6, being connected by a toggle-joint, 7, with the upper end of the said upright, 5. The upright, 5, is suitably secured, as by brackets, 8, or otherwise, to the side of the windshield frame, 9, or other suitable fixed portion of the vehicle, whereby the lazy-tongs may be extended and retracted from and toward the side of the vehicle. The free ends of the lazy-tongs carry a mirror, so mounted that when the lazy-tongs are retracted in their normal position the mirror will be disposed in a plane substantially transversely of the vehicle, whereby the roadway in the rear of the vehicle is revealed in the mirror to the driver; and extending of the lazy-tongs extends the mirror from the car and positions it in a plane longitudinally of the car, whereby the entire side of the car is visible in the mirror to the driver. For this purpose I prefer to provide an elongated or oval-shaped mirror, 10, within a suitable frame, 11. To the upper end of the mirror frame, 11, is swivelly secured, as at 12, a rod, 13, the lower end of which is pivoted on one end of a lever, 14, fulcrumed as at 15, on the pivot of the lower ends of the second pair of lazy-tongs arms, the opposite end of the lever, 14, being pivotally connected to one end of a suitable link, 16, the opposite end of which is pivoted, as at 17, to the upper free end of the lazy-tongs. On the side of the mirror frame adjacent the car is a bolt, 18, on which rotates an ear, 19, having pivoted thereon, as at 20, one end of a rod, 21, the opposite end of which is pivoted coaxially with the pivot, 17. The lower free end of the lazy-tongs has pivoted thereon a rod, 22, normally extending upwardly and provided at its upper end with an eye, 23, slidably encircling the rod, 21, and normally positioned adjacent the lower end of the rod, 21. The elements of the above-described mirror mounting are so connected and related that when the lazy-tongs are retracted, or in their normal position, the mirror is disposed transversely of and at the side of the vehicle, as shown in full lines in Fig. 1; and when extended, as shown in dotted lines, the spreading of the lazy-tongs causes the link, 16, and lever, 14, to cooperate with the rods, 13 and 21, to extend the mirror in a plane approximately longitudinally of the vehicle, during which operation the rod, 22, slides to the upper or outer end of the rod, 21, finally assuming an inclined position to prevent sagging of the mirror.

The lazy-tongs are preferably controlled by means of a horizontally-disposed handle bar, 24, pivoted at its outer end, as at 25, to one of the intermediate nodal points of the lazy-tongs, and provided on its inner end with a suitable hand-grip, 26, whereby the driver may conveniently extend and retract the lazy-tongs. Means are provided for latching the lazy-tongs in their normal or retracted position, comprising a projection, 27, on the bar, 24, engageable with a stud, 28, on the upright, 5. To limit the outward movement of the lazy-tongs a second projection, 29, is provided on the bar, 24, to engage the stud, 28. Obviously, the latch member, 27, is disengageable from the stud, 28, by swinging the handle bar, 24, outwardly.

Having thus described my invention, what I claim as new and desire to secure by Letters Patent of the United States, is,—

A vehicle attachment comprising a mirror, and an extensible and retractable lazy-tong support therefor adapted to be mounted at one end to the side of a vehicle, a rod pivoted to one side of the mirror and the upper free lazy-tong arm, a second rod pivoted on the lower free lazy-tong arm and slidable on said first rod, a lever fulcrumed on a lower intermediate arm of the lazy-tongs, a third rod pivoted on one end of the lever and the top of the mirror, and a link pivoted at one end to said lever and at the other to said upper free lazy-tong arm, said lazy-tongs, rods, lever, link and mirror being so connected and related that the mirror is shifted to a plane substantially transversely of the vehicle when the lazy-tongs are retracted, and to a plane longitudinally of the vehicle when the lazy-tongs are extended.

In testimony whereof, I have hereunto set my hand this 22nd day of August, 1922.

DOUGLAS J. IBACH.